May 30, 1950  W. H. GREEN  2,509,683
LIQUID TREATING APPARATUS AND PROCESS
Filed March 16, 1946  3 Sheets-Sheet 2
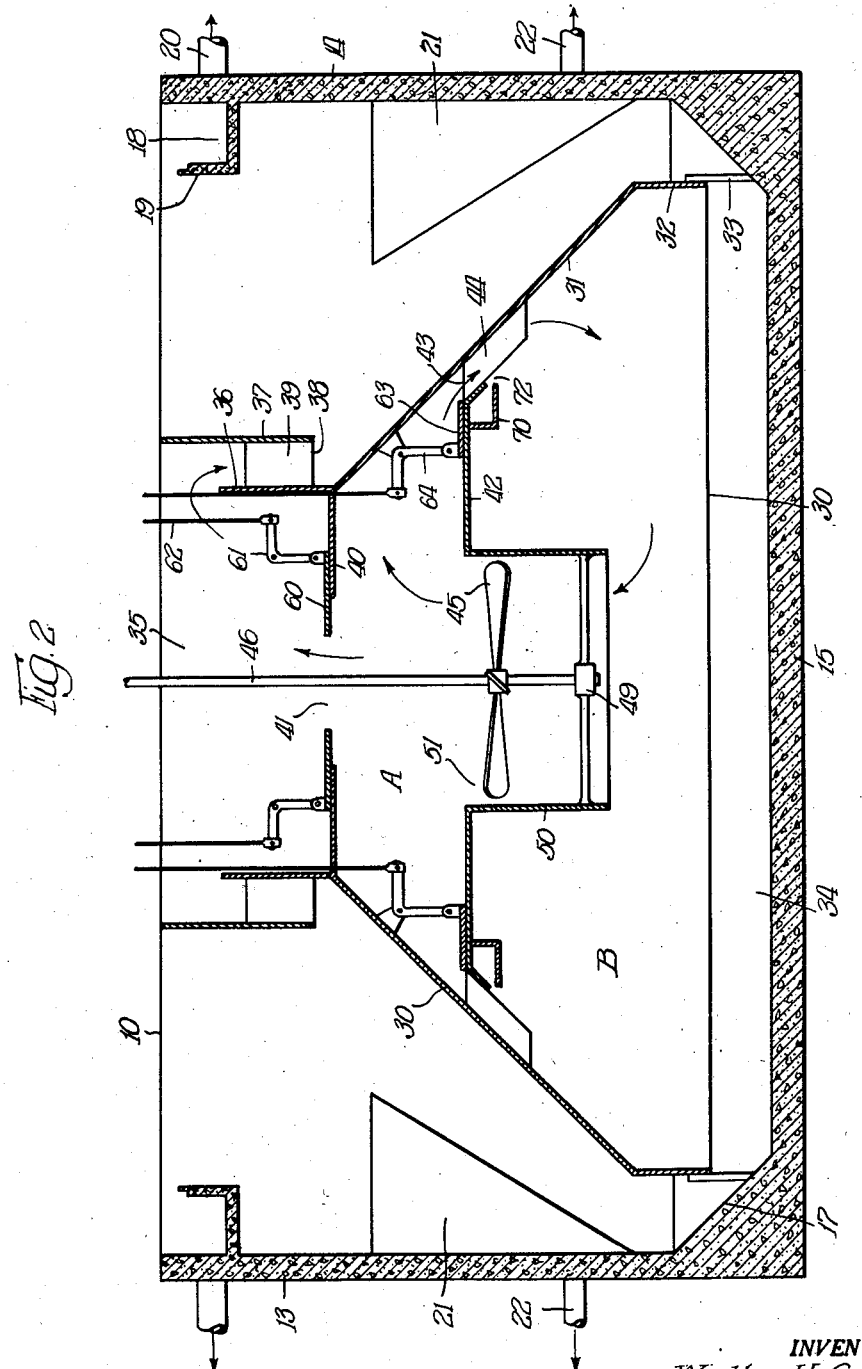
INVENTOR.
Walter H. Green,
BY
ATTY.

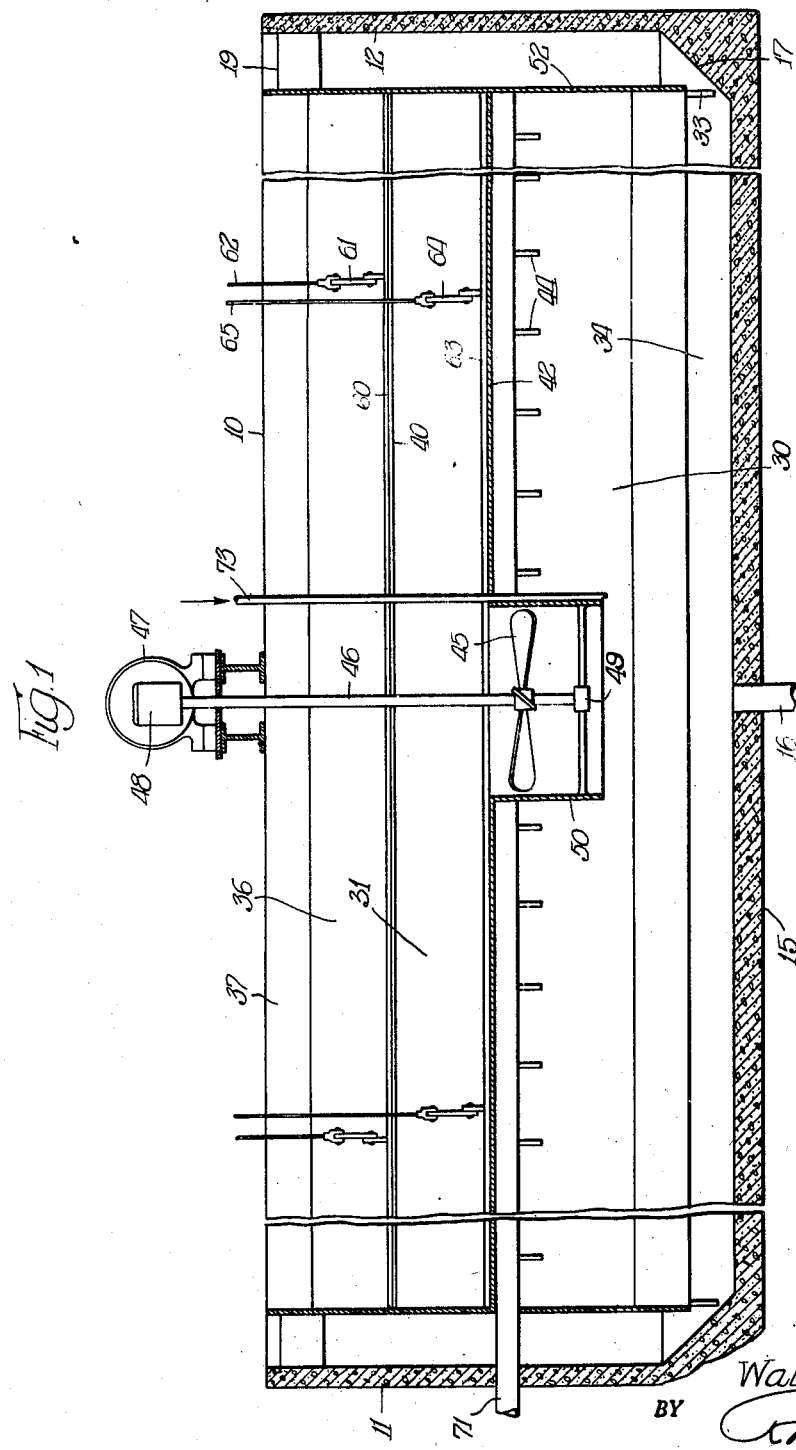

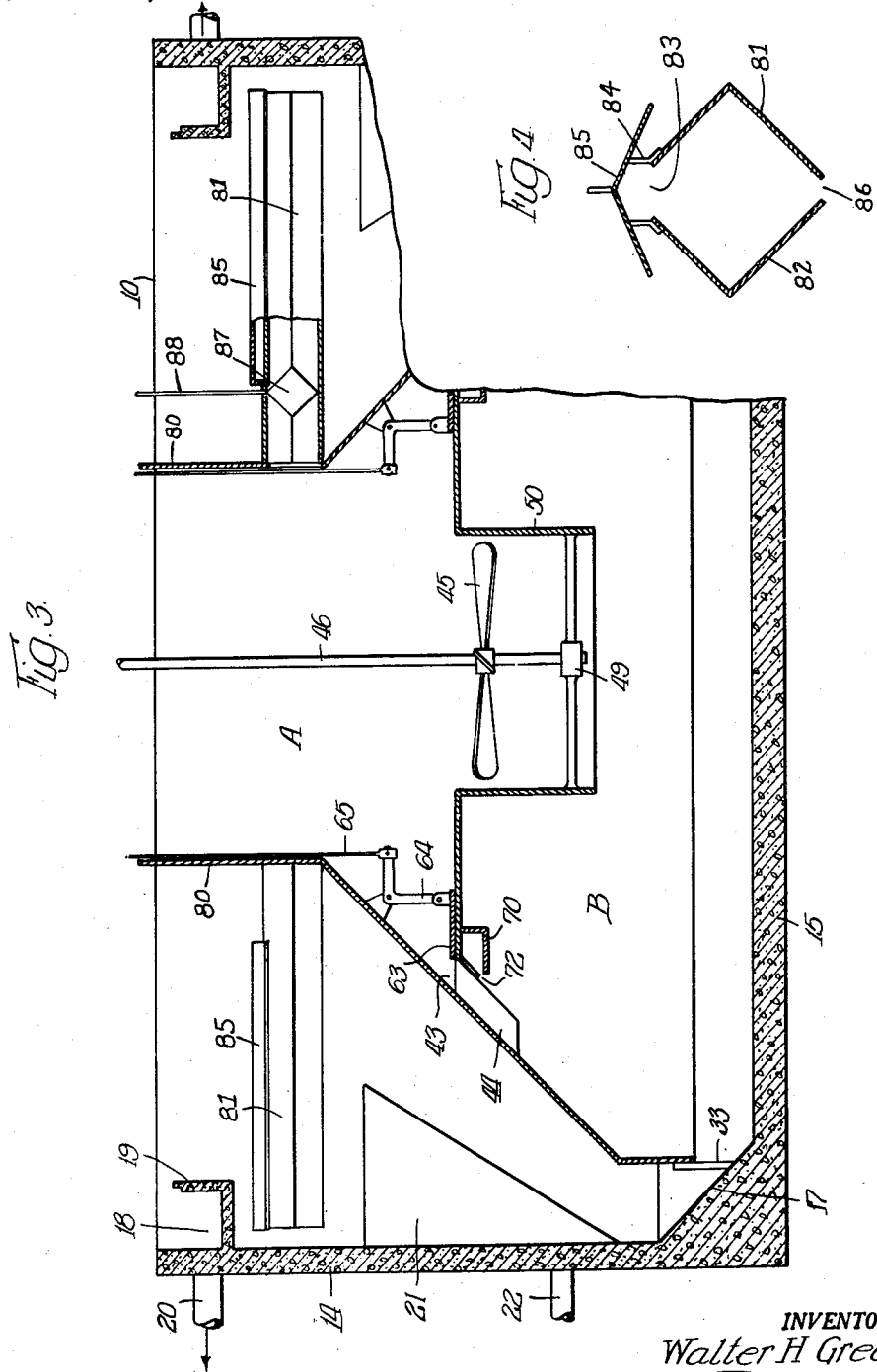

Patented May 30, 1950

2,509,683

UNITED STATES PATENT OFFICE 2,509,683

LIQUID TREATING APPARATUS AND PROCESS

Walter H. Green, Batavia, Ill., assignor to Infilco Incorporated, Chicago, Ill., a corporation of Delaware Application March 16, 1946, Serial No. 654,861

13 Claims. (Cl. 210—16)

This invention relates to an apparatus and method for treating liquid by what is known as the "slurry" process.

One object of my invention is to provide an apparatus in which, and a process by which, the available space of the treating tank is more fully and more efficiently utilized; and in this connection my invention has particular advantage in relatively shallow or in relatively long rectangular treating tanks.

Another object of my invention is to improve operation of apparatus such as that described in the patent to Hughes, No. 2,245,587, and to control the operation of the equipment for the slurry type of liquid treatment.

A further object of this invention is to provide in a slurry treating apparatus and process, and particularly one adapted for an elongated basin, a means for accurate control of flow into the quiescent clarification zone, and the relative volumes of such flow to circulation in the mixing chamber.

A still further object of my invention is to provide a slurry treating process and apparatus wherein the relative volumes of the flows from the mixing zone to the clarification zone and the recirculation within the mixing zone may be controlled separately, with the result that operating results can also be controlled.

A principal application of my invention is concerned with the treatment of water, such as softening or clarifying, in a relatively long or a relatively shallow tank.

Apparatus of the type sold under the trade name "Accelator," has found wide acceptance in industrial and municipal treatment of water and other liquids. However, such apparatus has been heretofore practically restricted to either round or square treating basins, and also required basins having considerable depth. I have discovered that the process carried out in such equipment can be readily used in relatively long, rectangular basins, or in rather shallow basins, and in this respect my invention is an improvement on such apparatus and process. I am enabled to secure very satisfactory results in what heretofore was considered an unsatisfactory size or shape of a treating basin, or to improve results in the usual round basin, by interposing what might be called a "pressure chamber" between the primary mixing zone and the flow passage discharging into the quiescent part of the basin, and returning part of the liquid from the pressure chamber to the mixing zone.

The "Accelator" apparatus, as usually constructed, consists essentially of a sloping wall structure forming a hood in the lower portion of the treating tank, a flow passage leading from the top of the hood and discharging downwardly over the hood, and one or more impellers so constructed and positioned as to cause a circulation of liquid under the hood and a circulation from the top of the hood through the passageway and over the hood—the latter circulation being considerably in excess of the throughput of the basin. The hood is so designed that its capacity is several times the maximum inflow in gallons per minute, so that when the plant is in operation the slurry, the water to be treated and the chemical reagents are mixed and circulated for a period of several minutes under the hood, then flow through the flow passage, down over the top of the hood and back under the hood—an output quantity rising as treated and fully clarified liquid from the slurry outside the hood.

I have found that two factors which have heretofore been overlooked are important in determining the efficiency of the Accelator type apparatus: (a) the velocity and turbulence of the flow through the passageway, particularly as it is discharged out over the top of the hood and (b) the relative volume and velocities of flows under the hood and through the passageway. Thus I have found that some Accelators did not give maximum efficiency because the impeller caused either a too turbulent flow through the passageway and out over the hood, or passed too much over the hood and failed to provide sufficient agitation under it. It will be remembered that in apparatus of this type, in which the entire reaction is compressed into a relatively short period, changes in the character of the water may necessitate considerable change in velocities, relative volumes of flow, and the like. I have found that if a chamber, which can most descriptively be called a "pressure chamber," is interposed between the hood and the flow passage, and is provided with valved openings leading into the flow passage and also back under the hood, I can control such factors and can secure much more efficient and uniform results from this type of apparatus, as in this way the flows or velocities in the separate passageways and spaces can be regulated independently.

It has also been generally accepted that equipment of the Accelator type could be operated most efficiently in round and relatively deep tanks. When the principle was applied to a rectangular tank, or to one of unusually shallow depth in relation to diameter, construction difficulties are experienced and the overall efficiency is reduced.

I have found that this difficulty was due to the fact that in the usual slurry type apparatus, and particularly those in oblong basins, flows were not uniform in all parts of the apparatus. Thus in one portion, usually at a point removed from the agitator or impeller, velocities would be much slower than close to it. However, the rate of operation of such a plant is determined by the maximum velocity found therein, so that reducing these maximum velocities to an operating value, reduced velocities at other points to inefficient levels. I have found that by interposing the pressure chamber between the hood and the flow passage, I am able to distribute the flows more evenly throughout the volume of the hood and throughout the length of the passageway discharging over it. This results in more uniform flows in all parts of the treating basin and raises the operating efficiency of the plant as a whole.

When applied to a shallow treating basin, the intermediate pressure chamber permits a recycling of a much larger proportion of the slurry under the hood, thereby permitting a slower and less turbulent flow through the passageway and over the hood, with the result that the outer space is more quiescent and the slurry interface between slurry and clear water in the quiescent section is more stable. This permits reducing by a considerable amount the depth of clear water above the slurry interface.

When considered as an apparatus my invention comprises a treating basin with the usual inlet and outlet, a hood in the lower part of the basin, a passageway leading from the top of the space enclosed by the hood and discharging over the hood, impelling means for causing recirculation of material under the hood and a flow through the passageway, a partition so constructed and arranged in relation to the hood and to the impeller as to form a pressure chamber between the hood and the passageway, and outlet openings, preferably valved, discharging from the pressure chamber into the passageway and also directly back into a lower portion of the space enclosed by the hood for return of liquid from the pressure chamber thereto. When considered as a process my invention comprises an improvement over the conventional slurry treating process wherein liquid to be treated and chemical treating reagents are mixed in and with a slurry containing solids separated from previously treated liquid, in a mixing zone, and a portion of such slurry is passed from the mixing zone through a relatively quiescent slurry holding space and back into the mixing zone, clear liquid escaping from the upper surface of the slurry in the slurry holding space. I add to the conventional slurry process the step of pumping slurry from the mixing zone into a pressure chamber and directing part of the flow from the pressure chamber over the hood and directing another and major portion back into the mixing zone in a manner to insure proper distribution and direction of the return flow whereby mixing is secured or aided, and controlling the actual and relative volume of the two such flows.

My invention will be more readily understood from the drawings and description which follow:

Figure 1 is a vertical, longitudinal cross-sectional view of a preferred embodiment of my invention.

Figure 2 is a transverse, vertical cross-sectional view of the apparatus shown in Figure 1; or in a round or square tank, a diametrical vertical cross-sectional view of a preferred form of my invention.

Figure 3 is a transverse, vertical cross-sectional view of a modified form of apparatus.

Figure 4 is a cross-sectional view of the distribution arms shown in Figure 3.

In order to more completely describe my invention I have shown it as applied to a rectangular, or oblong, treating basin although it will be obvious to those skilled in the art that it can also be applied to round or square treating tanks. Thus I show a tank 10 formed by end walls 11 and 12, respectively, side walls 13 and 14, respectively, and a floor 15. Preferably the basin 10 will be provided with a valved drain 16 and an integral fill 17 between the side walls and floor of the basin as shown. The tank 10 is also provided with a launder 18, separated from the tank proper by a weir 19, and discharging into effluent conduit 20. In an oblong treating basin it is usually advantageous, to provide a launder 18 along each side wall, 13 and 14 respectively, so that treated water can be taken from each side of the basin. Preferably, the basin 10 is also provided with one or more sludge concentrators 21 from which leads a sludge discharge line 22. The sludge concentrators 21, as is now known in the art, are open-top pockets. The sludge concentrators 21 are placed at a suitable elevation on the side walls, and in a rectangular basin there should be one or more such concentrators on each side wall 13 or 14.

In a rectangular treating basin, the arrangement of parts will preferably be symmetrical on both sides of the axis of the basin, and in a circular tank, the arrangement of parts will be as near as practicable, symmetrical about the center. For this reason duplicate parts, one on each side of the axis (as in Figure 2), will be given only one reference character.

In the basin 10 I place a hood 30 which in an oblong basin would preferably be formed by sloping plates 31. At the lower end of the plates 31 preferably are placed vertical skirts 32. The hood structure is supported by any suitable means such as legs 33. The hood 30 will, at any elevation, preferably have a shape corresponding to that of the basin, i. e. will be rectangular in a rectangular basin or circular in a circular basin. As is well known in the art the hood 30 is spaced above the floor of the tank so as to provide a continuous slot 34 below the hood to afford communication from the outer portion of the tank into the lower portion of the space confined by the hood. A passageway 35 leads from the top of the hood and discharges over the top thereof. In the form shown in the figures the passageway 35 is formed by vertical partition walls 36 affixed to the upper edge of each of the sloping plates 31, the wall 36 terminating below the liquid level in the tank as established by the weir 19, and a second pair of vertical walls, or partitions, 37 extending from above the liquid level to a level adjacent that of the top of the plates 31, and spaced a suitable distance from the inner walls 36. Thus the passageway 35 leads from the upper portion of the space enclosed by the hood 30 upwardly inside the inner vertical walls 36 and then downwardly between the parallel walls 36 and 37, discharging (in Figures 1 and 2) through the outlets 38 over the top of the plates 31. Preferably I provide a plurality of stilling baffles 39 between the parallel walls 36 and 37 so as to eliminate as much as possible tangential, or diagonal, flows which might upset operation of the plant. In an elongated basin the sloping plates 31 and the partition walls 36 and 37 may extend substantially the length of the basin, in which case the hood 30 and passageway 35 may be closed by a solid partition 52, as shown in Figure 1.

For purposes of my invention it is desirable that the hood 30 be provided with a relatively flat top such as is provided by a horizontal plate 40 leaving a central communication 41 between the top of the hood and the passageway 35. A short distance below the horizontal plate 40 is placed a horizontal floor 42 which extends the full length of the hood 30 and substantially from side to side thereof and which is provided with a central inlet opening 51, as hereafter described. The floor 42 is spaced a short distance from the sloping walls 31 so as to provide relatively narrow slots 43 between the space above the floor 42 and the lower part of the hood. At the slots 43, I provide a plurality of flow directing baffles 44 perpendicular to the sloping walls 31 of the hood, so that flows issuing from the space A above the floor 42, which for convenience will be called the "pressure chamber," will be normal to that surface and not diagonal. I have found that diagonal flows in a rectangular basin tend to strike the surface of the fill at an angle and deflect upwardly outside the hood, thus causing boils in the outer chamber. The directing baffles 44 prevent such action and therefore tend to make the apparatus more efficient.

In most sizes of oblong basins a single propeller will be sufficient to secure the desired circulation, although in those which are relatively longer than ordinary, two or more may be desirable. Thus in the figures I show a single propeller 45 placed at the intersection of the longitudinal and transverse axis of the basin. The propeller 45 is mounted on a suitable shaft 46 driven by a motor 47 through a speed reducer 48. The shaft 46 preferably is journaled in a suitable bearing 49 at its lower end, as shown. Surrounding the propeller is a cylindrical wall 50, forming a passageway 51 which affords communication from the mixing chamber B to the pressure chamber A. When the propeller 45 is driven at a suitable speed, liquid is pumped from the lower part of the hood into the pressure chamber A, from where it is distributed through the slot 41 leading to the passageway 35 and the slots 43 leading back to the mixing chamber B in the lower part of the space enclosed by the hood.

In many installations it is possible to predetermine the relative areas of the slots 41 and 43 so as to provide a predetermined relation between the flow through the upper passageway 35 and that back to the space B in the lower part of the hood. However, in some instances it is desirable to provide means for varying the size of one or both, so as to vary the proportion of these flows as operating conditions demand. Thus I show a pair of horizontal valve plates 60 adjustable to vary the width of the slot 41. For purposes of illustration the plates 60 are shown as resting upon the roof 40 of the pressure chamber A, and as adjustable through the medium of bell cranks 61 and adjusting rods 62. Likewise the lower slots 43 are shown as equipped with adjustable valve plates 63 which can be adjusted to their proper position through the medium of bell cranks 64 and adjusting rods 65. Thus the relative areas of the slots or passageways 41 and 43 can be adjusted from time to time as may be necessary or expedient, such as by change in the character of the liquid being treated or the like.

It should be obvious that in many, if not most, instances it will not be necessary to provide both the passageway 35 and the slots 43 with a valve means, for varying the size of the orifice in either will automatically vary the amount and velocity of the flow through the other as well.

The water to be treated and the treating reagents should be introduced in such a manner as to provide for a complete and rapid mixing of the water and chemical with the slurry in the tank. Thus, in a rectangular basin, it is preferred that raw water be introduced through longitudinal conduits 70 beneath and adjacent the outer side of the floor 42 of the pressure chamber as shown. These inlets communicate with raw water lines 71. Each of the inlets is provided with a small slot 72 discharging parallel to the flow through the slots 43 from the pressure chamber A into the lower space or mixing chamber B. The treating reagent is introduced through chemical feed line 73 which can discharge into the raw water line 71 or into the space below the hood, as shown.

It will be seen that the horizontal floor 42 divides the space under the hood into a pressure chamber A above the floor and a primary mixing zone B below it. Rotation of the propeller 45 causes liquid to be pumped from the lower space B into the upper space A. As the slots 41 and 43 are somewhat restricted pressure will be built up in the pressure chamber A to cause flow upwardly through the slot 41 and passageway 35 which discharges downwardly over the hood 30, and another flow outwardly through slots 43 inside the hood. According to the width of the slots 41 and 43, a greater or lesser proportion of the total flow will pass through them. Ordinarily it is preferred that a minor portion pass through the passageway 35 and back through the slot 34 into the mixing chamber B, and a major portion be returned directly to the lower mixing space B under the hood for further mixing and reaction with slurry, water and chemical.

The operation of the apparatus of my invention will be readily apparent. In general the operation of my apparatus is similar to that of conventional "Accelators." However, on operation of the propeller 45 liquid is pumped from the lower mixing chamber B into the pressure chamber A. It is assumed that the pumping capacity of the propeller 45 will be in excess of the volume of liquid that will pass through the upper slot 41 into passageway 35 and that the slots 43 will be restricted, as by moving the valve plates 43 toward a closed position, so as to create a higher pressure in the pressure chamber A. This higher pressure will naturally cause a flow of the balance of the pumping capacity through the slots 43 directly back into the mixing zone B. Thus I deliberately create in the chamber A a volume of liquid which is subjected to pressure greater than that found in other parts of the basin. This results in a uniform flow through the upper slot 41 into the passageway 35 throughout its entire length, resulting in a uniform flow over the entire area of the hood. The excess pressure in the pressure zone A also causes a uniform flow of liquid through the entire length of the slots 43, thus providing for excellent mixing of the slurry, raw liquor and reagent. By adjusting the position of the valve plates 60 or 63, or both, I am able to control the proportion of flows between the two paths and thus control the amount of mixing and the velocity of flow over the hood.

It is obvious that by means of my apparatus

I am enabled to cause uniform operating conditions throughout an oblong tank of considerable length, and thus secure uniform treating capacity throughout the whole volume of the basin. Unless the tank is exceptionally long I have found that a single liquid moving member, such as a propeller 45, is sufficient to provide proper operation. In fact a single large propeller gives better results than a plurality of smaller ones, as in apparatus of the usual design flows from two or more propellers or other liquid moving members conflict, often resulting in the deposit of sludge in various parts of the basin.

I have found in some installations, and particularly those in which the depth of clear liquid in the upper part of the basin is relatively shallow, that it is expedient to provide means for positively distributing the flow of slurry throughout the cross-sectional area of the quiescent chamber. When the width of the basin is relatively great in relation to its depth, I have found that the discharge of slurry through the passageway 35 and its lower open end 38 downwardly over the hood 31 does not utilize the full width of the clarification basin to its best advantage. In such types of apparatus I prefer to provide a plurality of distributing arms such as are shown in Figure 3. The basin and the partition structure which form the hood, and the two separate chambers under the hood are essentially the same as in Figure 2 and need not be described. In this form, the passageway 35 is replaced by a plurality of flow distribution arms. In this embodiment vertical walls 80 rise from the top of the sloping walls 31 to above the liquid level in the basin. In the embodiment shown in Figure 3, the pressure chamber has no roof but is open to the atmosphere so that it is necessary that the confining walls 80 rise substantially above the liquid level to prevent flow over such walls, as the operation of the propeller 45 will cause the liquid level in the pressure chamber to be considerably higher than elsewhere in the basin. Extending laterally from the vertical wall 80 are flow distributing arms 81. One of these arms is shown in cross-section in Figure 4. The distributing arm comprises a substantially square trough 82 mounted so that the diagonals between corners constitute the vertical and horizontal axes. The top corner is cut off to provide a slot 83 as shown. Mounted above the slot 83, by any suitable means such as risers 84 is a V-shaped hood 85. The hood 85 is so designed as to direct flow issuing upwardly through the slot 83 horizontally and slightly downwardly from the trough 81. I also prefer to place a plurality of orifices or a slot 86 at the bottom corner of the trough as shown. These orifices or lower slots, either form being suitable, serve the double purpose of preventing deposit of solids in the trough itself and also of preventing the deposit of solids on the hood 31 underneath the slots, as without such downwardly discharging orifices there might be sufficient quiescence underneath the trough to permit such deposit. In the embodiment illustrated it is obvious there is no separate flow passage between the pressure chamber A and the flow distribution arms 81, so that I prefer to provide each arm with a gate valve 87 operated by an extension rod 88, as shown in the right-hand arm of Figure 3. By this means the flow through each arm can be accurately controlled. It will be obvious that a similar result could be secured by interposing a flow passage, such as 35, shown in Figure 2, between the high pressure chamber A and the plurality of flow arms 81. In that case the valve controlling the opening between the pressure chamber A and the flow passage would be sufficient to control the flow through the arms without the necessity of the individual valve in each arm.

Operation of the embodiment shown in Figure 3 is similar to that of Figures 1 and 2. The impeller 45 pumps a large amount of slurry from the lower mixing chamber B into the pressure chamber A, which in this instance extends to the top of the tank. From pressure chamber A slurry flows through the plurality of distribution arms from which it is distributed in a thin sheet immediately subjacent the slurry interface in the outer clarification space. Such an apparatus provides for a uniform distribution of slurry throughout the outer clarification space, and assists in uniform operation of all portions of the apparatus.

It will be obvious that the apparatus of my invention can take several forms. For example it can be applied with considerable value to round or square tanks, in which case Figure 2 would represent a vertical view taken along the diameter of the tank. It is obvious that the form of the pressure chamber can vary over a considerable range as the particular form of this chamber is not critical. In fact it could be placed in the space enclosed by the inner vertical walls 36. It is necessary, however, that there be a passageway from the pressure zone leading to the quiescent zone (discharging over the hood) and another passageway 43, leading a large portion of the flow from the liquid impeller directly back to the mixing chamber B. As indicated above, these passageways preferably are provided with means to adjust flows therethrough, so as to control the volumes and velocities of the flows in the various parts of the basin.

I claim:

1. Liquid treating apparatus comprising a tank, a treated liquid outlet from the upper part of the tank, a partition structure forming a hood in the lower part of the tank, a second partition inside the hood and dividing the space inside the hood into an upper pressure chamber and a lower mixing chamber, a passageway opening from the pressure chamber and discharging downwardly over the upper side of the hood, a passageway opening from the pressure chamber to the mixing chamber and located inside and adjacent the sides of the hood, a passageway leading from the mixing chamber to the pressure chamber, a mechanically driven liquid moving member so positioned and of such a capacity as to pump a volume of liquid through said last mentioned passageway from the mixing chamber into the pressure chamber in excess of the capacity of said passageway leading from said pressure chamber, for discharge through said second mentioned passageway into said mixing chamber, to establish a circulation throughout, and to mix the contents of, said mixing chamber, liquid inlet means for delivering liquid to be treated and a treating reagent to said mixing chamber, and a solids outlet from the lower part of said tank.

2. Liquid treating apparatus comprising a basin, a treated liquid outlet from the upper portion of said basin, a solids outlet from a lower portion of said basin, a partition structure forming in said basin a mixing chamber in the lower part of the basin and a pressure chamber in the central portion of the basin superposed over said mixing chamber, a passageway leading from the pressure chamber and discharging downwardly over said partition structure, an inlet from said mixing chamber to said pressure chamber, a power driven pumping member so positioned in relation to said inlet as to cause flow from said mixing chamber into said pressure chamber, inlet means in the lower part of said basin so constructed and arranged as to deliver liquid to be treated and a treating reagent to said mixing chamber, a return passageway leading from the pressure chamber to the mixing chamber adjacent the sides thereof, said pumping member being of such a capacity as to pump a volume of liquid in excess of the capacity of said first mentioned passageway for discharge through said return passageway into said mixing chamber, to establish a circulation in, and mix the contents of, said mixing chamber and valve means for controlling flow through each of said passageways.

3. Liquid treating apparatus comprising a basin, a treated liquid outlet from the upper portion of said basin, a solids outlet from a lower portion of said basin, a partition structure forming in said basin a mixing chamber in the lower part of the basin and a pressure chamber in the central portion of the basin superposed over said mixing chamber, and a laterally adjacent quiescent chamber and three passageways, one between the quiescent chamber and the mixing chamber adjacent the floor of the basin, the second leading from the pressure chamber and discharging into an intermediate level of the quiescent chamber, and the third leading from the pressure chamber and discharging into the mixing chamber, inlet means in the lower part of said basin so constructed and arranged as to deliver liquid to be treated and a treating reagent to said mixing chamber, an inlet from said mixing chamber into said pressure chamber, a power driven pumping member so positioned as to cause flow through said inlet and of such a capacity as to pump a volume of liquid in excess of the capacity of said second passageway, through said inlet for discharge through said third passageway, to establish a circulation in, and mix the contents of, said mixing chamber, and valve means for controlling flows through said second and third passageways.

4. In a liquid treating apparatus comprising a basin, a treated liquid outlet from the upper part of said basin, a sloping wall structure forming a centrally located hood in the lower part of said basin, a passageway leading from the upper portion of said hood and discharging over said sloping wall structure, means adapted to mix the contents under said hood and to cause a flow through said passageway, a solids outlet from the lower part of said basin, and inlet means for introducing liquid to be treated and a treating reagent under said hood, the combination of a partition structure forming a pressure chamber in the upper portion of the space enclosed by said hood, an inlet into said pressure chamber from the lower portion of the space enclosed by said hood, and an outlet from said pressure chamber to the lower portion of the space enclosed by said hood.

5. A liquid treating apparatus comprising a basin, a treated liquid outlet in the upper part of said basin, a solids outlet from the lower part of said basin, a wall structure forming a centrally located hood in the lower part of said basin and a quiescent chamber in the upper part of said basin, inlet means in the lower portion of said basin so constructed and arranged as to deliver liquid to be treated and a treating reagent to said hood, a passageway leading from the upper portion of said hood and discharging downwardly over said hood, and a power driven impeller adapted to mix the contents of said hood and to cause a flow through said passageway, characterized by a second partition structure forming a pressure chamber in the upper portion of said hood and a mixing chamber in the lower portion thereof, an inlet associated with said impeller and affording communication into said pressure chamber from said mixing chamber, and outlets from said pressure chamber into the mixing chamber.

6. In a liquid treating apparatus including a basin, a treated liquid outlet in the upper part of said basin, a solids outlet from a lower portion of said basin, a centrally located partition structure in the lower part of said basin forming an enclosed mixing chamber and an upper quiescent chamber, inlet means in the lower portion of said basin so constructed and arranged as to deliver liquid to be treated and a treating reagent to said mixing chamber, a passageway leading from the upper portion of the space enclosed by said partition structure and discharging outwardly on the outside of such structure, and a power driven impeller adapted to mix the contents of said mixing chamber and to cause a flow through said passageway, the improvement which comprises a second partition structure forming a pressure chamber interposed between said mixing chamber and said passageway, an inlet from the mixing chamber into said pressure chamber, an outlet from said pressure chamber to said passageway, a flow passage from said pressure chamber into the mixing chamber, and means for controlling the relative volumes of the flows from said pressure chamber through said passageway and said flow passage, respectively.

7. Liquid treating apparatus comprising an elongated tank, a partition structure forming an elongated hood in the lower part of the tank spaced above the floor thereof, an outlet from the top of said hood, a second partition means forming a passageway leading from said outlet and discharging downwardly above the hood on each side thereof, a third partition forming a pressure chamber in the upper part of the hood, a return passageway leading from the pressure chamber to the lower portion of the space enclosed by the hood and located adjacent the sides of the hood, an inlet into said pressure chamber from the lower portion of the space enclosed by the hood, a power-driven liquid moving member so positioned as to pump liquid through said inlet into the pressure chamber, a treated liquid outlet from the upper part of the tank, a liquid inlet discharging under the hood and a solids outlet from a lower portion of the tank.

8. Liquid treating apparatus comprising a basin, a treated liquid outlet from the upper portion of said basin, a solids outlet from a lower portion of said basin, means forming in said basin a mixing chamber in the lower part of the basin, a pressure chamber in the central portion of the basin superposed over said mixing chamber and a laterally adjacent quiescent chamber, inlet means into the lower portion of said basin so constructed and arranged as to deliver liquid to be treated and a treating reagent to the mixing chamber, a passageway from the pressure chamber discharging outwardly in said quiescent chamber, an inlet from said mixing chamber to said pressure chamber, pumping means so positioned in relation to said inlet as to cause flow from said mixing chamber into said pressure chamber, a return passageway from the pressure chamber to the mixing chamber, and means for controlling flow through each of said passageways.

9. Liquid treating apparatus comprising a basin, a treated liquid outlet from the upper portion of said basin, an inlet into the lower portion of said basin, a solids outlet from a lower portion of said basin, a partition structure forming in said basin a mixing chamber in the lower part of the basin, a pressure chamber in the central portion of the basin superposed over said mixing chamber and laterally extending quiescent chamber, an inlet opening from the lower part of the quiescent chamber into said mixing chamber, an inlet opening from the mixing chamber into the pressure chamber, a power driven pumping member so positioned as to cause flow through said last mentioned inlet opening, horizontally extending flow arms leading from said pressure chamber across an intermediate elevation of the quiescent chamber, orifices in said flow arms, a passageway leading from the pressure chamber and discharging into the mixing chamber, and valve means for controlling flows through said flow arms.

10. A process for treating water which comprises maintaining a body of slurry containing solids accumulated from previously treated water, mixing such slurry, water to be treated, and a treating reagent in a confined mixing zone in the lower portion of said body of slurry to form additional slurry, continuously pumping slurry from said mixing zone into a pressure zone in an upper portion of said body of slurry, passing one portion of the slurry from the pressure zone laterally below the upper surface of the unconfined portion of the body of slurry and thence back into the confined mixing zone, and passing another portion of the slurry from the pressure zone directly back into the confined mixing zone, exuding clarified water from the upper surface of the unconfined portion of the slurry into a clear water space and then withdrawing the clear water from the upper part of said clear water space, and withdrawing excess solids from said body of slurry.

11. In a process for treating water wherein water to be treated and a reagent are mixed in and with a slurry of water undergoing treatment and solid particles accumulated from previously treated water in a confined mixing zone and a predetermined portion of the slurry in the mixing zone is discharged from the mixing zone and passed into a lower portion of a quiescent clarification zone, clarified water being displaced from the upper surface of the slurry in the quiescent zone into a clear water space in the upper portion of said quiescent zone and thereafter from the upper part of said quiescent zone, and a portion of such discharged slurry is returned to the mixing zone, the improvement which comprises pumping a quantity of slurry in excess of said predetermined portion from the mixing zone into an intermediate pressure zone, passing the predetermined portion of the slurry into said clarification zone from such pressure zone, and returning the excess portion directly to the mixing zone.

12. A process for treating water which comprises maintaining a body of water undergoing treatment, dividing said body of water into a confined mixing zone in the lower portion of said body of water, a superposed pressure zone and a laterally adjacent quiescent zone, mixing water to be treated, slurry containing particles collected from previously treated water and a treating reagent in the confined mixing zone to form additional slurry, pumping said slurry into the pressure zone, passing a portion of the slurry in the pressure zone outwardly across an intermediate level of the quiescent zone and passing another portion of the slurry in the pressure zone directly back into the confined mixing zone, returning a portion of slurry from the lower level of the quiescent zone into the confined mixing zone, withdrawing clarified water from the slurry in the quiescent zone upwardly into a clear water space and thence from the clear water space, and withdrawing excess solids from said body of slurry.

13. Liquid treating apparatus comprising an elongated tank, a longitudinal partition structure forming an elongated mixing space arranged longitudinally in the lower part of the tank, means including a power driven pumping member forming a zone of increased pressure at a level above said mixing space, a passageway leading from the upper part of said pressure zone and discharging outwardly in said tank outside of said space and said zone at a level substantially below the top of said tank, a passageway, for returning a portion of the liquid in the pressure zone directly to the mixing space, said pumping member having such a capacity as to pump a volume of liquid in excess of the capacity of the passageway from the upper part of said pressure zone, for discharge through said return passageway from said pressure zone to said mixing space, to establish a circulation in, and mix the contents of, said mixing space, a treated liquid outlet from the upper part of the tank, means for delivering liquid to be treated to the mixing space, means for delivering treating reagent to the liquid to be treated, and a solids outlet from a lower portion of the tank.

WALTER H. GREEN.

REFERENCES CITED

The following references are of record in the file of this patent:

UNITED STATES PATENTS

| Number | Name | Date |
| --- | --- | --- |
| 2,245,587 | Hughes | June 17, 1941 |
| 2,264,139 | Montgomery et al. | Nov. 25, 1941 |
| 2,348,122 | Green | May 2, 1944 |
| 2,348,123 | Green et al. | May 2, 1944 |
| 2,427,886 | Walker | Sept. 23, 1947 |
| 2,429,315 | Green | Oct. 21, 1947 |